(12) United States Patent
Jung et al.

(10) Patent No.: US 10,938,049 B2
(45) Date of Patent: Mar. 2, 2021

(54) DEVICE FOR DECREASING CONCENTRATION OF HYDROGEN EXHAUSTED FROM FUEL CELL

(71) Applicants: HYUNDAI MOTOR COMPANY, Seoul (KR); KIA MOTORS CORPORATION, Seoul (KR)

(72) Inventors: Myung Ju Jung, Daejeon (KR); Jinwoo Koo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/821,316

(22) Filed: Mar. 17, 2020

(65) Prior Publication Data

US 2020/0220188 A1    Jul. 9, 2020

Related U.S. Application Data

(62) Division of application No. 15/377,900, filed on Dec. 13, 2016, now Pat. No. 10,637,085.

(30) Foreign Application Priority Data

Oct. 10, 2016  (KR) .......................... 10-2016-0130654

(51) Int. Cl.
*B01D 51/00* (2006.01)
*H01M 8/0662* (2016.01)
(Continued)

(52) U.S. Cl.
CPC .......... *H01M 8/0662* (2013.01); *B01D 46/10* (2013.01); *B01D 53/8678* (2013.01);
(Continued)

(58) Field of Classification Search
CPC ....... H01M 8/0662; H01M 2008/1095; H01M 2250/20; B01D 53/00; B01D 2273/30;
(Continued)

(56) References Cited

U.S. PATENT DOCUMENTS 3,033,643 A  *  5/1962  Janes ..................... B01D 53/00
                                                    423/210
3,973,759 A     8/1976  Mizrahi et al.
(Continued)

FOREIGN PATENT DOCUMENTS

JP      2003-142131 A      5/2003
JP      2005-299865 A     10/2005
(Continued)

*Primary Examiner* — Dung H Bui
(74) *Attorney, Agent, or Firm* — Brinks Gilson & Lione

(57) ABSTRACT

A device for decreasing a concentration of hydrogen exhausted from a fuel cell through an exhaust line includes: a first housing connected to the exhaust line and having an exhaust gas moving path and an air inlet formed therein; a pumping part installed in the first housing and sucking air through the air inlet; a second housing coupled to the first housing and having an air diluting part and a diluted gas moving path formed therein, the air diluting part being connected to the exhaust gas moving path and the diluted gas moving path being connected to the air diluting part; and a nozzle member spraying the air introduced into the air inlet to the air diluting part while being rotated.

5 Claims, 14 Drawing Sheets

(51) Int. Cl.
*B01D 53/86* (2006.01)
*B01D 46/10* (2006.01)
*B01D 46/00* (2006.01)
*F24F 3/16* (2021.01)
*B01D 45/14* (2006.01)
*B04B 5/12* (2006.01)
*F01M 13/04* (2006.01)
*H01M 8/1018* (2016.01)

(52) U.S. Cl.
CPC .......... *B01D 45/14* (2013.01); *B01D 46/0023* (2013.01); *B01D 46/0041* (2013.01); *B01D 2257/108* (2013.01); *B01D 2258/0208* (2013.01); *B04B 5/12* (2013.01); *B04B 2005/125* (2013.01); *F01M 2013/0422* (2013.01); *F24F 3/1603* (2013.01); *H01M 2008/1095* (2013.01); *H01M 2250/20* (2013.01); *Y02T 90/40* (2013.01)

(58) Field of Classification Search
CPC ................ B01D 46/10; B01D 46/0041; B01D 46/0023; B01D 45/14; Y02T 90/32; F24F 3/1603; F01M 2013/0422; F01M 13/04; B04B 2005/125; B04B 5/12
See application file for complete search history.

(56) References Cited

U.S. PATENT DOCUMENTS

| | | |
|---|---|---|
| 5,534,118 A | 7/1996 | McCutchen |
| 5,693,125 A | 12/1997 | Dean |
| 5,997,619 A | 12/1999 | Knuth et al. |
| 6,033,450 A * | 3/2000 | Krul ........................ B01D 45/14 55/345 |
| 6,471,738 B1 | 10/2002 | Thompson et al. |
| 7,927,395 B2 * | 4/2011 | Szepessy .................. B04B 7/14 55/406 |
| 2005/0081556 A1 | 4/2005 | Kim et al. |
| 2006/0150592 A1* | 7/2006 | Iizuka ................ B01D 46/0056 55/400 |
| 2006/0210859 A1 | 9/2006 | Choi et al. |
| 2007/0007194 A1 | 1/2007 | Yoshida et al. |
| 2007/0163215 A1* | 7/2007 | Lagerstadt ................ B04B 7/02 55/406 |
| 2007/0218328 A1 | 9/2007 | Osada |
| 2010/0294134 A1 | 11/2010 | Yokomizo et al. |
| 2014/0370412 A1 | 12/2014 | Sumser et al. |
| 2015/0211782 A1 | 7/2015 | Ikeda et al. |
| 2016/0032931 A1 | 2/2016 | Lee |
| 2016/0354720 A1 | 12/2016 | Lee |
| 2017/0122582 A1* | 5/2017 | Chong .................... B01D 46/10 |
| 2017/0122587 A1* | 5/2017 | Son ........................ B01D 46/10 |

FOREIGN PATENT DOCUMENTS

| | | |
|---|---|---|
| JP | 2006-344476 A | 12/2006 |
| KR | 10-2009-0062350 A | 6/2009 |
| KR | 10-1405651 B1 | 6/2014 |
| KR | 10-2014-0096218 A | 8/2014 |
| KR | 10-2015-0058814 A | 5/2015 |

* cited by examiner

DEVICE FOR DECREASING CONCENTRATION OF HYDROGEN EXHAUSTED FROM FUEL CELL

CROSS-REFERENCE TO RELATED APPLICATION

This application is a divisional application of non-provisional U.S. patent application Ser. No. 15/377,900, filed on Dec. 13, 2016, which claims priority to and the benefit of Korean Patent Application No. 10-2016-0130654, filed on Oct. 10, 2016, the entire contents of which are incorporated herein by reference.

FIELD

The present disclosure relates to a device for decreasing a concentration of hydrogen exhausted from a fuel cell capable of decreasing a concentration of hydrogen in exhaust gas.

BACKGROUND

The statements in this section merely provide background information related to the present disclosure and may not constitute prior art.

Generally, a fuel cell system is a kind of power generation system generating electric energy by supplying air and hydrogen to fuel cells and generating an electrochemical reaction between the hydrogen and oxygen in the fuel cells. For example, the fuel cell system has been used to drive a driving source such an electric motor in a vehicle, a ship, a train, an airplane, and the like.

The fuel cell system includes a stack in which the fuel cells are stacked, a hydrogen supplying device supplying hydrogen to anodes of the fuel cells, an air supplying device supplying air to cathodes of the fuel cells, and a heat/water managing device removing heat and water, which are reaction products of the fuel cells, and controlling a driving temperature of the stack.

In a polymer electrolyte membrane fuel cell, appropriate moisture is required in order for an ion-exchange membrane of a membrane-electrode assembly (MEA) to perform a smooth role. To this end, the fuel cell system has used a humidifying device humidifying reaction gas supplied to the stack.

The humidifying device humidifies the air supplied from the air supplying device using moisture in hot and humid air exhausted from the cathodes of the fuel cells, and supplies the humidified air to the cathodes of the fuel cells.

In addition, the fuel cell system includes a hydrogen re-circulating device mixing hydrogen exhausted from the anodes of the fuel cells and the hydrogen supplied from the hydrogen supplying device with each other and again supplying the mixed hydrogen to the anodes.

Meanwhile, impurities such as nitrogen, vapor, and the like, are accumulated in the anodes of the fuel cells during driving the fuel cell system, such that a concentration of hydrogen becomes low, and in the case in which the concentration of hydrogen becomes excessively low, a phenomenon such as separation of the cell, or the like, may occur in the fuel cell stack.

In order to solve this problem, in the fuel cell system, the concentration of hydrogen in the anodes has been managed at a predetermined level or more by periodically opening purge valves at the time of initial start-up and driving of the fuel cell system and exhausting the impurities together with the hydrogen from the anodes.

Here, when the anodes are purged by opening the purge valves, the hydrogen is exhausted together with the impurities from the anodes, and this purge gas is introduced together with the air exhausted from the cathodes into the humidifying device.

In this case, the vapor in the impurities is used as a humidifying source of reaction gas required for an electrochemical reaction of the fuel cells in the humidifying device, and gas such as the hydrogen, the nitrogen, and the like, is exhausted together with the air to the atmosphere through an exhaust system.

Therefore, in the hydrogen purge method as described above, the hydrogen exhausted from the anodes is mixed with the air exhausted from the cathodes, and is then exhausted into the atmosphere through the exhaust system, thereby promoting an air dilution effect of a concentration of purge hydrogen.

Furthermore, at the time of initial start-up and stop of the fuel cell system or in an idle condition of a fuel cell vehicle using the fuel cell system (for example, an idle stop and go (ISG) condition of the fuel cell vehicle), a significant amount of hydrogen crossed over from the anodes of the fuel cells to the cathodes of the fuel cells through a membrane is exhausted.

This hydrogen is exhausted together with the air from the cathodes of the fuel cell to the humidifying device, is diluted by the air in the humidifying device, and is exhausted into the atmosphere through the exhaust system in a state in which a concentration thereof is decreased.

However, in the related art, the exhausted hydrogen is mixed with the air exhausted from the cathodes in the humidifying device depending on the driving condition of the fuel cell system as described above to partially decrease the concentration of hydrogen, but it is difficult to implement a sufficient mixing effect between the hydrogen and the air, such that the concentration of hydrogen is not sufficiently decreased.

Therefore, in the related art, the concentration of hydrogen exhausted from the fuel cell system is not effectively decreased, and a condition in which hydrogen that is not diluted may be exhausted is sufficiently present depending on a driving condition of the fuel cell system, such that a risk of fire and explosion may be caused by a concentration of exhausted hydrogen exceeding a set range.

In order to prevent the risk of the fire and the explosion, a method for exhausting the hydrogen into the air through the exhaust system in a state in which the concentration of hydrogen is decreased to a predetermined level or less is used in the fuel cell system.

Recently, in order to prevent the risk of the fire and the explosion by the hydrogen exhausted from the fuel cell, the concentration of hydrogen exhausted into the atmosphere through the exhaust system of the fuel cell system has been restricted to be less than at most 8% and be less than 4% on average for three seconds in related regulations of Korea and global technical regulations (GTR).

The disclosure of this section is to provide background of the invention. Applicant notes that this section may contain information available before this application. However, by providing this section, Applicant does not admit that any information contained in this section constitutes prior art.

SUMMARY

An embodiment of the present invention provides a device for decreasing a concentration of hydrogen exhausted from a fuel cell, configured in an exhaust system of a fuel cell system exhausting exhaust gas containing hydrogen and air exhausted from the fuel cell into the atmosphere through an exhaust line, including: a first housing connected to the exhaust line and having an exhaust gas moving path and an air inlet formed therein; a pumping part installed in the first housing and sucking air through the air inlet; a second housing coupled to the first housing and having an air diluting part and a diluted gas moving path formed therein, the air diluting part being connected to the exhaust gas moving path and the diluted gas moving path being connected to the air diluting part; a motor part installed in the second housing so as to be connected to the pumping part; and a nozzle member installed at a shaft of the motor part between the motor part and the pumping part, and spraying the air introduced into the air inlet to the air diluting part while being rotated by the shaft.

On the basis of the case in which the exhaust gas is exhausted from a front to a rear through the exhaust line, the device for decreasing a concentration of hydrogen exhausted from a fuel cell may be mounted in the course of the exhaust line at a rear end portion of the exhaust line.

An exhaust gas introduction pipe may be coupled to a front end of the first housing.

An exhaust gas introduction pipe may be connected to a front connection end in the course of the exhaust line.

A diluted gas exhaust pipe may be coupled to a rear end of the second housing.

A diluted gas exhaust pipe may be connected to a rear connection end in the course of the exhaust line.

The first housing may include: a first body having a cylindrical shape of which a front end and a rear end are opened; and a first channel forming member connected to an inner peripheral surface of the first body through first connection ribs having a radial shape and forming the exhaust gas moving path between the first channel forming member and the inner peripheral surface of the first body.

In the first channel forming member, a first gas inducing surface having a conical shape may be formed at a front end of the first channel forming member, and a first mounting groove in which the pumping part is mounted may be formed at a rear end of the first channel forming member.

The air inlet may penetrate through the first body and the first connection ribs and be connected to the first mounting groove.

The second housing may include: a second body coupled to a rear end of the first housing and having a cylindrical shape of which a front end and a rear end are opened; and a second channel forming member connected to an inner peripheral surface of the second body through second connection ribs having a radial shape and forming the air diluting part and the diluted gas moving path between the second channel forming member and the inner peripheral surface of the second body.

The air diluting part may form a mixing zone connected to the exhaust gas moving path of the first housing.

A mixing protrusion for partitioning the mixing zone may be formed at a front end of the second channel forming member so as to protrude from an outer peripheral edge of the second channel forming member toward the first housing.

The diluted gas moving path may be formed between a rear end of the second channel forming member and the second body.

A second gas inducing surface having a conical shape may be formed at the rear end of the second channel forming member.

A second mounting groove in which the motor part is mounted may be formed at the front end of the second channel forming member.

The second housing may further include: coolant moving grooves formed in the second connection ribs and connected to the second mounting groove; a coolant inlet formed in the second body and penetrating through and connected to the coolant moving groove of any one of the second connection ribs; and a coolant outlet formed in the second body and penetrating through and connected to the coolant moving groove of the other of the second connection ribs.

The nozzle member may include a nozzle body having a disk shape having an outer ring part formed at an edge portion thereof.

In the nozzle member, a spraying groove may be formed at an inner side of the outer ring part, and a plurality of nozzle holes penetrating through the spraying groove may be formed along the spraying groove.

In the nozzle member, the nozzle member may be formed in an impeller type in which a plurality of impeller wings having a curved surface are disposed between first and second disks and an air introduction hole is formed in any one of the first and second disks.

The air diluting part may be connected to a front end of the exhaust gas moving path through a bypass pipeline.

A first connection hole connected to the air diluting part may be formed in the first housing.

A second connection hole connected to the first connection hole through the bypass pipeline may be formed in the exhaust gas introduction pipe.

Another embodiment of the present invention provides a device for decreasing a concentration of hydrogen exhausted from a fuel cell, configured in an exhaust system of a fuel cell system exhausting exhaust gas containing hydrogen and air exhausted from the fuel cell into the atmosphere through an exhaust line, including: a first housing connected to the exhaust line and having an exhaust gas moving path and an air inlet formed therein; a pumping part installed in the first housing and sucking air through the air inlet; a second housing coupled to the first housing and having an air diluting part and a diluted gas moving path formed therein, the air diluting part being connected to the exhaust gas moving path and the diluted gas moving path being connected to the air diluting part; a motor part installed in the second housing so as to be connected to the pumping part; a nozzle member installed at a shaft of the motor part between the motor part and the pumping part, and spraying the air introduced into the air inlet to the air diluting part while being rotated by the shaft; and a catalyst diluting part disposed in the diluted gas moving path of the second housing and diluting hydrogen in diluted gas in which a concentration of hydrogen is diluted by air in the air diluting part by a catalyst reaction.

A catalyst may be deposited on an inner wall surface of the diluted gas moving path in the second housing.

A catalyst may have a plurality of lattice holes formed to move the diluted gas, and be buried in the diluted gas moving path in the second housing.

The lattice holes may be formed so that cross-sectional areas thereof gradually become small in a moving direction of the diluted gas.

In the second housing, a coolant moving path moving a coolant in order to cool the motor part may be formed. In the second housing, a coolant forcible exhaust hole connecting the coolant moving path and the diluted gas moving path to each other may be formed. In the second housing, a cap formed of a polymer material destroyed at a set temperature may be installed in the coolant forcible exhaust hole.

Yet another embodiment of the present invention provides a device for decreasing a concentration of hydrogen exhausted from a fuel cell, configured in an exhaust system of a fuel cell system exhausting exhaust gas containing hydrogen and air exhausted from a humidifier into the atmosphere through an exhaust line, including: a first housing connected to the exhaust line and having an exhaust gas moving path and an air inlet formed therein; a second housing coupled to the first housing and having an air diluting part and a diluted gas moving path formed therein, the air diluting part being connected to the exhaust gas moving path and the diluted gas moving path being connected to the air diluting part; a motor part installed in the second housing; and a nozzle member installed at a shaft of the motor part, and spraying the air introduced into the air inlet to the air diluting part while being rotated by the shaft.

The air inlet may be connected to a breathing hole of an air compressor for supplying the air to the humidifier through a connection line.

In embodiments of the present invention, hydrogen in exhaust gas exhausted into the atmosphere through an exhaust system of a fuel cell system is diluted by external air and a catalyst, and a concentration of exhaust hydrogen is effectively decreased, thereby making it possible to satisfy fuel cell vehicle exhaust hydrogen restriction related regulations of Korea and global technical regulations (GTR) and secure a competitive advantage in terms of a decrease in hydrogen exhausted from a fuel cell vehicle.

Further areas of applicability will become apparent from the description provided herein. It should be understood that the description and specific examples are intended for purposes of illustration only and are not intended to limit the scope of the present disclosure.

DRAWINGS

Since the accompanying drawings are provided only to describe embodiments of the present invention, it is not to be interpreted that the spirit of the present invention is limited to the accompanying drawings.

Figure 1:
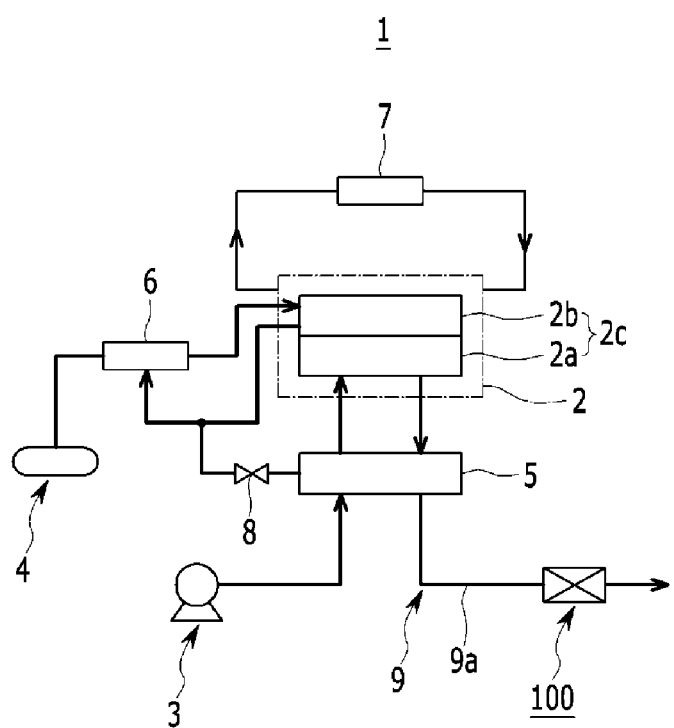
FIG. 1 is a block diagram schematically showing an example of a fuel cell system to which an embodiment of the present invention is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, embodiments of the present invention will be described more fully with reference to the accompanying drawings so as to be easily practiced by those skilled in the art to which the present invention pertains. As those skilled in the art would realize, the described embodiments may be modified in various different ways, all without departing from the spirit or scope of the present invention.

A description for contents that are not associated with the present invention will be omitted in order to clearly describe the present invention, and like reference numerals designate like elements throughout the specification.

Since sizes and thicknesses of the respective components were arbitrarily shown in the accompanying drawings for convenience of explanation, the present invention is not limited to contents shown in the accompanying drawings. In addition, thicknesses were exaggerated in order to obviously represent several portions and regions.

In addition, in the following description, the terms 'first', 'second', and the like, will be used to distinguish components having the same configuration from each other, and will not be necessarily limited to a sequence thereof.

Throughout the present specification, unless explicitly described to the contrary, the word "comprise" and variations such as "comprises" or "comprising", will be understood to imply the inclusion of stated elements but not the exclusion of any other elements.

In addition, the terms "~unit", "~means", "~part", "member", and the like, described in the specification mean units of a comprehensive configuration for performing at least one function and operation.

FIG. 1 is a block diagram schematically showing an example of a fuel cell system to which an embodiment of the present invention is applied.

Referring to FIG. 1, the fuel cell system 1 to which an embodiment of the present invention is applied is a power generation system generating electrical energy by an electrochemical reaction between a fuel and an oxidizing agent, and may be configured in, for example, a fuel cell vehicle driving an electrical motor by the electric energy.

In an embodiment of the present invention, the fuel used in the fuel cell system 1 may be defined as hydrogen gas (hereinafter, referred to as "hydrogen" for convenience), and the oxidizing agent used in the fuel cell system 1 may be defined as air.

The fuel cell system 1 basically includes a fuel cell stack 2, an air supplying unit 3, a hydrogen supplying unit 4, a humidifier 5, a hydrogen re-circulating unit 6, and a heat/water managing unit 7.

The fuel cell stack 2 is an electricity generation assembly of fuel cells 2c each including a membrane, a cathode 2a, and an anode 2b. The fuel cells 2c may receive hydrogen at the anodes 2b thereof and receive air at the cathodes 2a thereof to generate electric energy by an electrochemical reaction between the hydrogen and oxygen.

The air supplying unit 3 is driven by receiving power applied thereto, and supplies air in the atmosphere to the cathodes 2a of the fuel cells 2c. The air supplying unit 3 may include an air compressor or an air blower. The hydrogen supplying unit 4 may include a hydrogen tank compressing and storing the hydrogen therein and supplying the hydrogen to the anodes 2b of the fuel cells 2c.

The humidifier 5 may include a membrane-humidifying device humidifying the air supplied from the air supplying unit 3 using air exhausted from the cathodes 2a of the fuel cells 2c and containing moisture and supplying the humidified air to the cathodes 2a.

The hydrogen re-circulating unit 6 is to re-circulate hydrogen exhausted from the anodes 2b of the fuel cells 2c to the anodes 2b. The hydrogen re-circulating unit 6 may mix the hydrogen exhausted from the anodes 2b and the hydrogen supplied from the hydrogen supplying unit 4 with each other through an ejector, or the like, and supply the mixed hydrogen to the anodes 2b.

The heat/water managing unit 7 is to remove heat and water, which are byproducts generated at the time of the electrochemical reaction of the fuel cells 2c, and control a driving temperature of the fuel cell stack 2.

Since various components of the fuel cell system 1 described above are well-known to a person of an ordinary skilled in the art, a detailed description therefor will be omitted in the present specification.

Meanwhile, in the case in which the fuel cell system 1 as described above is used in a fuel cell vehicle, the fuel cell system 1 exhausts hydrogen due to cross-over together with air from the cathodes 2a of the fuel cells 2c and exhausts purge hydrogen from the anodes 2b of the fuel cells 2c, when the vehicle is started.

In addition, the fuel cell system 1 exhausts only purge hydrogen from the anodes 2b of the fuel cells 2c when the vehicle is driven, and exhausts hydrogen due to cross-over together with air from the cathodes 2a of the fuel cells 2c when the vehicle is stopped or is in an idle condition (for example, an idle stop and go (ISG) condition).

Here, the cross-over hydrogen may be defined as hydrogen crossed over to the cathodes 2a through membranes by residual pressure of hydrogen present in the anodes 2b of the fuel cells 2c when driving of the fuel cell system 1 is stopped.

In addition, the purge hydrogen may be defined as hydrogen exhausted together with impurities from the anodes 2b by an operation of a purge valve 8 in order to remove the impurities such as nitrogen, vapor, and the like, accumulated in the anodes 2b of the fuel cells 2c during driving the fuel cell system 1.

As described above, hydrogen containing the hydrogen or the air exhausted from the fuel cells 2c is supplied to the humidifier 5 by way of example, and is exhausted together with air from the humidifier 5. The hydrogen is diluted by the air, and is exhausted in a state in which a concentration thereof is partially decreased.

In embodiments, when the vehicle is started, is driven, and is stopped or is in the idle condition, the hydrogen exhausted from the fuel cells 2c is introduced together with the air exhausted from the fuel cells 2c into the humidifier 5, and may be exhausted in a state in which a concentration thereof is partially decreased by the air.

The fuel cell system 1 includes an exhaust system 9 for exhausting the gas (which is gas containing the hydrogen and the air and will hereinafter be called "exhaust gas") exhausted through the humidifier 5 into the atmosphere. Here, the exhaust gas includes water and vapor, in addition to the hydrogen.

The exhaust system 9 described above includes an exhaust line 9a fixedly installed from the front to the rear in a lower structure of the vehicle. The exhaust line 9a moves the exhaust gas from the front of the vehicle to the rear of the vehicle, and exhausts the exhaust gas into the atmosphere.

Further, the exhaust line 9a is an exhaust pipe moving the exhaust gas, and various components such as a muffler decreasing exhaust noise, a sensor sensing a concentration of hydrogen, and the like, may be installed in the course of the exhaust line 9a.

Meanwhile, when the vehicle is started and is stopped or is in the idle condition, a low flow rate of exhaust gas is exhausted through the exhaust line 9a. The vehicle condition as described above is a low flow rate condition and a low pressure condition of the exhaust gas. In this case, the exhaust gas includes a relatively high concentration of hydrogen.

In addition, when the vehicle is driven, a high flow rate of exhaust gas is exhausted through the exhaust line 9a. The vehicle condition as described above is a high flow rate condition and a high pressure condition of the exhaust gas. In this case, the exhaust gas includes a relatively low concentration of hydrogen.

Here, the low flow rate/low pressure condition and the high flow rate/high pressure condition of the exhaust gas may be determined by power consumed in the air compressor or the air blower.

In an embodiment of the present invention, since the low flow rate/low pressure condition and the high flow rate/high pressure condition described above are clearly distinguished from each other depending on a state of the vehicle (a state in which the vehicle is started, a state in which the vehicle is driven, a state in which the vehicle is stopped, or a state in which the vehicle is in the idle condition), the low flow rate/low pressure condition and the high flow rate/high pressure condition are not limited to any specific numerical ranges.

A device 100 for decreasing a concentration of hydrogen exhausted from a fuel cell according to an embodiment of the present invention may be configured on the exhaust line 9a of the exhaust system 9. The device 100 for diluting hydrogen in the exhaust gas or decreasing a concentration of hydrogen exhausted from a fuel cell according to an embodiment of the present invention has a structure in which it may effectively decrease a concentration of hydrogen in the exhaust gas exhausted into the atmosphere through the exhaust system 9 in the various vehicle conditions as described above and satisfy fuel cell vehicle exhaust hydrogen restriction related regulations of Korea and global technical regulations (GTR).

In embodiments, in an embodiment of the present invention, the device 100 for decreasing a concentration of hydrogen exhausted from a fuel cell that may effectively decrease the concentration of hydrogen by diluting hydrogen in the exhaust gas exhausted through the exhaust line 9a by external air is provided.

Figure 2:
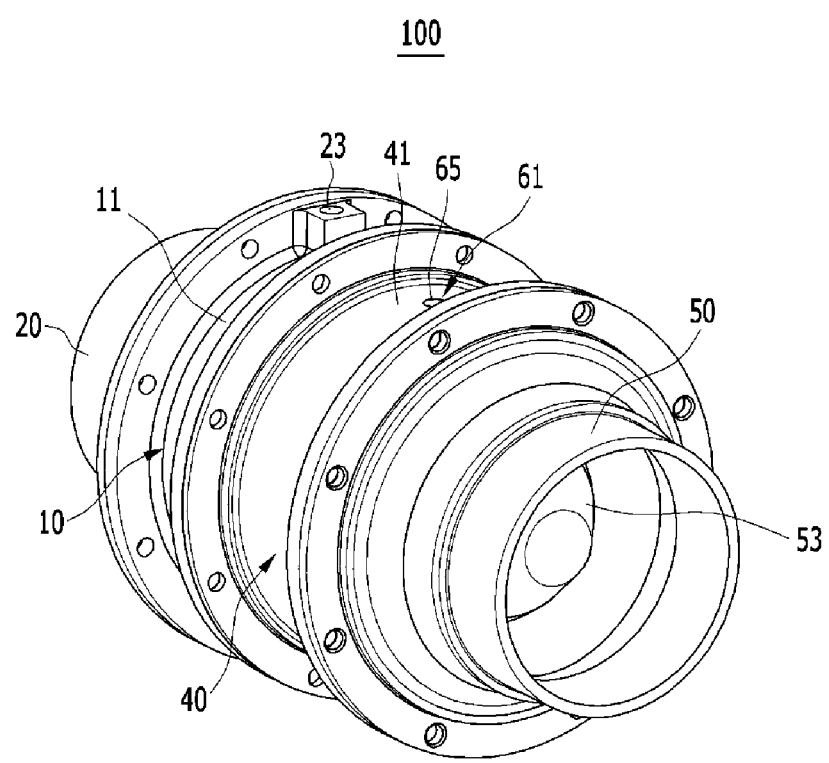
FIG. 2 is a perspective view showing a device for decreasing a concentration of hydrogen exhausted from a fuel cell according to an embodiment of the present invention.
Figure 3:
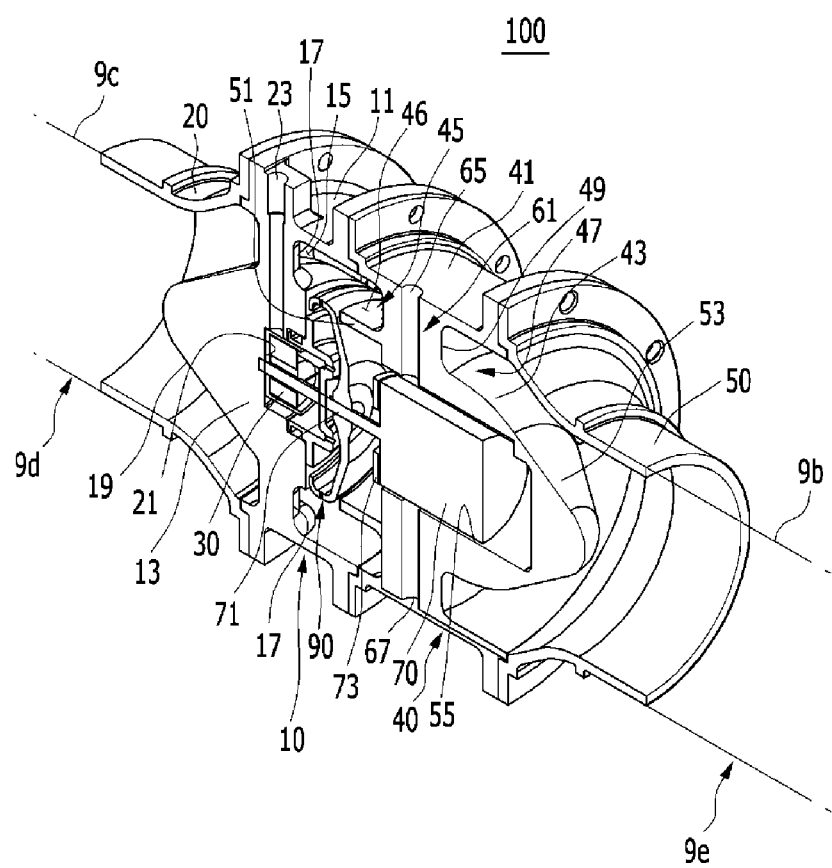
FIG. 3 is a partially cut-away perspective view of the device shown in FIG. 2.

FIG. 2 is a perspective view showing a device for decreasing a concentration of hydrogen exhausted from a fuel cell according to an embodiment of the present invention. FIG. 3 is a partially cut-away perspective view of the device shown in FIG. 2, and FIG. 4 is another partially cut-away perspective view of the device shown in FIG. 2.

Figure 4:
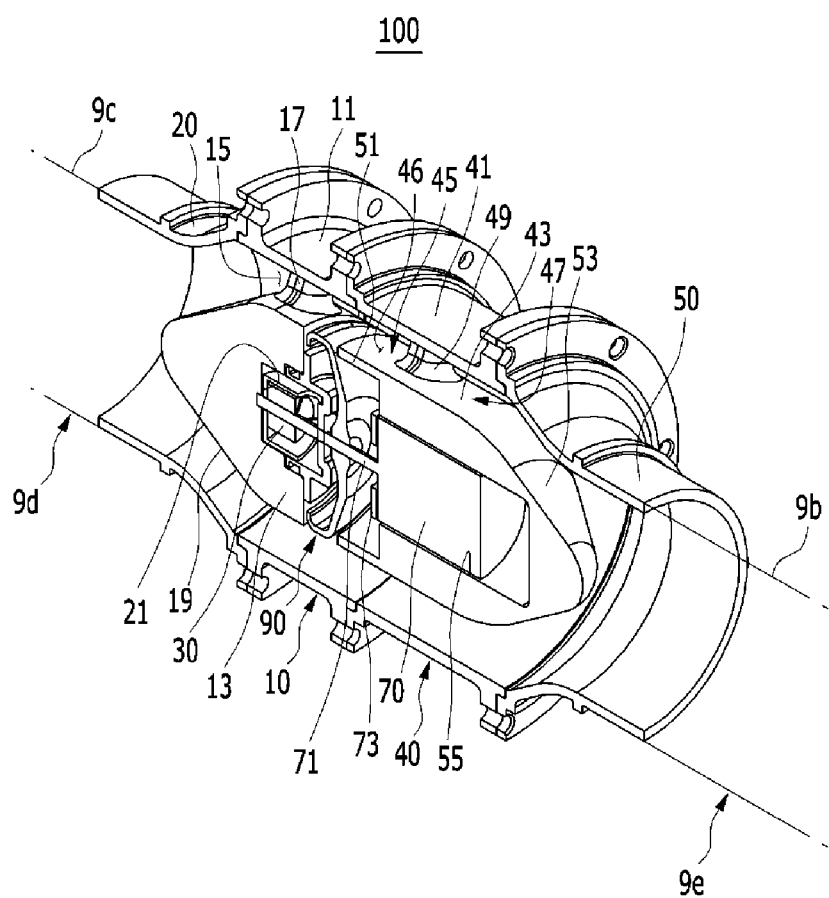
FIG. 4 is another partially cut-away perspective view of the device shown in FIG. 2.

Referring to FIGS. 2 to 4, the device 100 for decreasing a concentration of hydrogen exhausted from a fuel cell according to an embodiment of the present invention basically includes a first housing 10, a pumping part 30, a second housing 40, a motor part 70, and a nozzle member 90. The first housing 10 and the second housing 40 are coupled to each other to form a housing assembly.

Before describing the respective components as described above, the device 100 for decreasing a concentration of hydrogen exhausted from a fuel cell according to an embodiment of the present invention may be mounted in the course of the exhaust line 9a at a rear end portion of the exhaust line 9a.

The device 100 for decreasing a concentration of hydrogen exhausted from a fuel cell according to an embodiment of the present invention is mounted at the rear end portion of the exhaust line 9a, as described above, in order to prevent condensate from being frozen in the course of the exhaust line 9a in winter by easily exhausting the condensate generated by condensation of moisture in the exhaust gas moving along the exhaust line 9a.

In addition, the device 100 for decreasing a concentration of hydrogen exhausted from a fuel cell according to an embodiment of the present invention is mounted at the rear end portion of the exhaust line 9a in order to maximize dilution performance between the hydrogen in the exhaust gas exhausted through the exhaust line 9a and external air.

Here, a phrase "the course of the exhaust line 9a" may be defined as a zone between one portion 9b of a rear end portion in the entire exhaust line 9a and the other portion 9c except for the one portion 9b. The one portion 9b and the other portion 9c are fixedly installed to a lower structure of the vehicle.

The device 100 for decreasing a concentration of hydrogen exhausted from a fuel cell according to an embodiment of the present invention is mounted in the zone between the one portion 9b and the other portion 9c of the exhaust line 9a and connects the one portion 9b and the other portion 9c to each other.

Hereinafter, a connection end of the other portion 9c connected to the device 100 for decreasing a concentration of hydrogen exhausted from a fuel cell in the course of the exhaust line 9a will be referred to as a front connection end 9d. In addition, a connection end of the one portion 9b connected to the device 100 for decreasing a concentration of hydrogen exhausted from a fuel cell in the course of the exhaust line 9a will be referred to as a rear connection end 9e.

Further, the term "end" described above may be defined as an end of any one side or be defined as a certain portion (an end portion) including the end. In an embodiment of the present invention, the term "end" will be defined as the latter.

Meanwhile, the device 100 for decreasing a concentration of hydrogen exhausted from a fuel cell according to an embodiment of the present invention is not necessarily limited to being mounted in the course of the exhaust line 9a at the rear end portion of the exhaust line 9a as described above, but may also be mounted at a rear end (a rear terminal) of the exhaust line 9a.

However, an example in which the device 100 for decreasing a concentration of hydrogen exhausted from a fuel cell according to an embodiment of the present invention is mounted in the course of the exhaust line 9a at the rear end portion of the exhaust line 9a will hereinafter be described.

Figure 5:
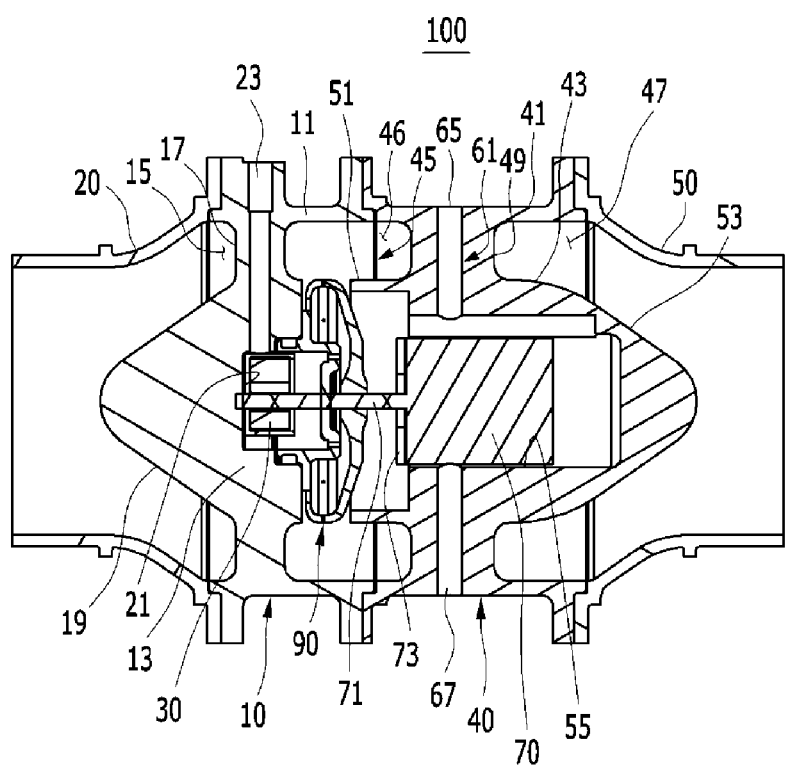
FIG. 5 is a cross-sectional view of the device shown in FIG. 2.
Figure 6:
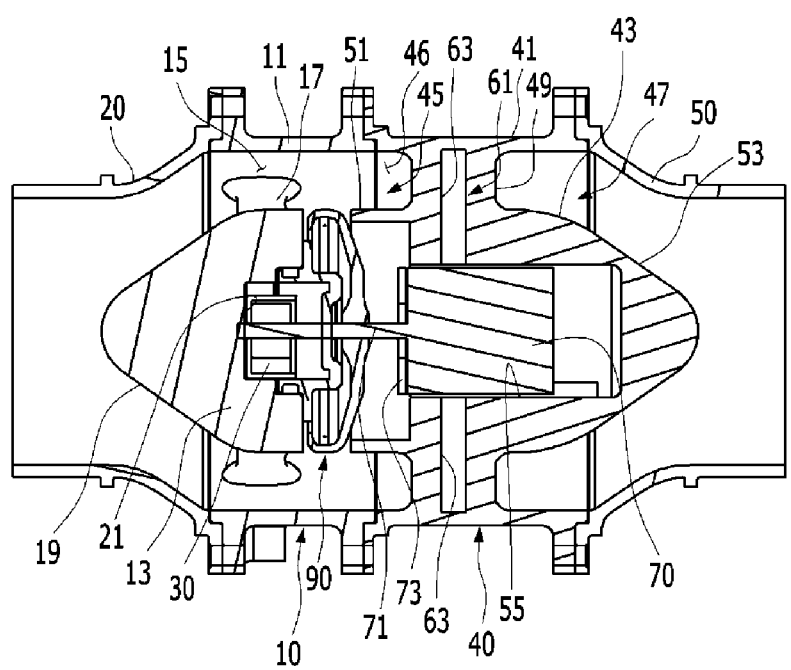
FIG. 6 is another cross-sectional view of the device shown in FIG. 2.

FIG. 5 is a cross-sectional view of the device shown in FIG. 2, and FIG. 6 is another cross-sectional view of the device shown in FIG. 2. Hereinafter, the following components will be described in detail with reference to FIGS. 5 and 6 together with the drawings provided above.

In an embodiment of the present invention, the first housing 10, which is connected to the front connection end 9d of the exhaust line 9a, is connected to the front connection end 9d through an exhaust gas introduction pipe 20. The exhaust gas introduction pipe 20 into which the exhaust gas exhausted to the exhaust line 9a is introduced is coupled to a front end of the first housing 10, and is connected to the front connection end 9d.

The first housing 10 includes a first body 11 and a first channel forming member 13. The first body 11 has a cylindrical shape of which a front end and a rear end (both ends) are opened, and is connected to the exhaust gas introduction pipe 20 having an inlet.

The first channel forming member 13 is disposed in the first body 11. The first channel forming member 13 forms an exhaust gas moving path 15 between an outer surface thereof and an inner peripheral surface of the first body 11. The exhaust gas moving path 15 is a channel through which the exhaust bas introduced from the exhaust line 9a into the exhaust gas introduction pipe 20 moves rearward.

The first channel forming member 13 is connected to the inner peripheral surface of the first body 11 through first connection ribs 17 having a radial shape. The number of first connection ribs 17 is two or more, for example, four, and the first connection ribs 17 are disposed to be spaced apart from each other by a predetermined interval in an inner peripheral direction of the first body 11.

The first connection ribs 17 integrally connect an outer surface of the first channel forming member 13 and the inner peripheral surface of the first body 11 to each other. Therefore, the exhaust gas moving path 15 is formed between the first connection ribs 17, between the outer surface of the first channel forming member 13 and the inner peripheral surface of the first body 11.

In addition, the first channel forming member 13 has a first gas inducing surface 19 formed at a front end thereof, the first gas inducing surface 19 having a conical shape such as a taper shape protruding forward. The first gas inducing surface or flow guide surface 19 serves to induce or guide the exhaust gas introduced from the exhaust line 9a into the exhaust gas introduction pipe 20 to the exhaust gas moving path 15 of the first housing 10 located in the peripheral region in the inside space of the housing assembly.

In addition, the first channel forming member 13 has a first mounting groove 21 formed at a rear end thereof. The first mounting groove 21 is formed forward at the rear end of the first channel forming member 13. The first mounting groove 21 is provided as an accommodating groove in which a pumping part 30 to be described below is mounted.

Further, the first housing 10 has air inlets 23 formed therein in order to introduce external air into the first mounting groove 21. The number of air inlets 23 formed in the first housing 10 may be one or more. The air inlet 23 has a hole shape penetrating through the first body 11 and the first connection rib 17 and connected to the first mounting groove 21.

The pumping part 30 as described above, which is a vacuum pumping means sucking the external air through the air inlet 23, includes, for example, a rotary vane as well-known to a person of an ordinary skilled in the art. The pumping part 30 is installed in the first mounting groove 21 of the first channel forming member 13. The pumping part 30 is rotatably installed in the first mounting groove 21.

In an embodiment of the present invention, the second housing 40, which is coupled to a rear end of the first housing 10, is connected to the rear connection end 9e of the exhaust line 9a. The second housing 40 is connected to the rear connection end 9e through a diluted gas exhaust pipe 50. The diluted gas exhaust pipe 50, which is to exhaust diluted gas in which a concentration of hydrogen in the exhaust gas is diluted by the external air at the second housing 40 and/or a coupled portion between the first and second housings 10 and 40, is coupled to a rear end of the second housing 40, and is connected to the rear connection end 9e.

The second housing 40 includes a second body 41 and a second channel forming member 43. The second body 41 has a cylindrical shape of which a front end and a rear end (both ends) are opened, is coupled to the rear end of the first body 11 of the first housing 10, and is connected to the diluted gas exhaust pipe 50.

The second channel forming member 43 is disposed in the second body 41. The second channel forming member 43 forms an air diluting part 45 and a diluted gas moving path 47 between an outer surface thereof and an inner peripheral surface of the second body 41.

The air diluting part 45 is to dilute the hydrogen in the exhaust gas introduced into the exhaust gas moving path 15 of the first housing 10 by the external air. A configuration of the air diluting part 45 described above will be described in more detail below.

In addition, the diluted gas moving path 47 is a path through which the diluted gas in which the concentration of hydrogen in the exhaust gas is diluted by the external air in the air diluting part 45 moves to the diluted gas exhaust pipe 50.

The second channel forming member 43 as described above is connected to the inner peripheral surface of the second body 41 through second connection ribs 49 having a radial shape. The number of second connection ribs 49 is two or more, for example, eight, and the second connection ribs 49 are disposed to be spaced apart from each other by a predetermined interval in an inner peripheral direction of the second body 41.

The second connection ribs 49 integrally connect an outer surface of the second channel forming member 43 and the inner peripheral surface of the second body 41 to each other. Therefore, the air diluting part 45 is connected to the exhaust gas moving path 15 of the first housing 10 through a space between the second connection ribs 49 between the outer surface of the second channel forming member 43 and the inner peripheral surface of the second body 41. In embodiments, the air diluting part 45 is disposed at a front side between the outer surface of the second channel forming member 43 and the inner peripheral surface of the second body 41 at the coupled portion between the first body 11 and the second body 41, and is connected to the exhaust gas moving path 15.

Therefore, the diluted gas moving path 47 is connected to the air diluting part 45 through the space between the second connection ribs 49 between the outer surface of the second channel forming member 43 and the inner peripheral surface of the second body 41. The diluted gas moving path 47 is disposed at a rear side between the outer surface of the second channel forming member 43 and the inner peripheral surface of the second body 41, and is connected to the air diluting part 45. In embodiments, the diluted gas moving path 47 is formed between a rear end of the second channel forming member 43 and the second body 41.

Meanwhile, the air diluting part 45 forms a mixing zone 46 connected to the exhaust gas moving path 15 of the first housing 10. The mixing zone 46 is a zone in which the exhaust gas introduced through the exhaust gas moving path 15 and the external air are mixed with each other, is formed at a front side between the outer surface of the second channel forming member 43 and the inner peripheral surface of the second body 41 at the coupled portion between the first body 11 and the second body 41.

In order to partition the mixing zone 46, a mixing protrusion 51 is formed at a front end of the second channel forming member 43. The mixing protrusion 51 protrudes from a front end outer peripheral edge of the second channel forming member 43 toward the first channel forming member 13 of the first housing 10. Therefore, the mixing zone 46 is extended toward the coupled portion between the first body 11 and the second body 41 between an outer surface of the mixing protrusion 51 and the inner peripheral surface of the second body 41, and may be connected to the exhaust gas moving path 15 of the first housing 10.

In addition, the second channel forming member 43 has a second gas inducing surface 53 formed at a rear end thereof, the second gas inducing surface 53 having a conical shape such as a taper shape protruding rearward. The second gas inducing surface 53 serves to induce the diluted gas introduced from the air diluting part 45 into the diluted gas moving path 47 to the diluted gas exhaust pipe 50.

In addition, the second channel forming member 43 has a second mounting groove 55 formed at a front end thereof. The second mounting groove 55 is formed rearward at the front end of the second channel forming member 43. The second mounting groove 55 faces the first mounting groove 21 of the first channel forming member 13, and is coaxial with an internal center of the first mounting groove 21, and is formed at the front end of the second channel forming member 43. The second mounting groove 55 is provided as an accommodating groove in which a motor part 70 to be described below is mounted.

The motor part 70 described above, which provides a torque to the pumping part 30, is installed in the second channel forming member 43 of the second housing 40. In detail, the motor part 70 is mounted in the second mounting groove 55 of the second channel forming member 43.

The motor part 70 includes a shaft 71 rotated at a set speed by an electrical signal. The motor part 70 is installed to be connected to the pumping part 30 through the shaft 71. Therefore, when the electrical signal is applied to the motor part 70 to rotate the shaft 71, the pumping part 30 is rotated in the first mounting groove 21 of the first housing 10, and may suck the external air through the air inlet 23 of the first housing 10.

Therefore, the motor part 70 is mounted in the second mounting groove 55 of the second channel forming member 43 through a mounting bracket 73 so as to be spaced apart from an inner peripheral surface of the second mounting groove 55 by a predetermined gap. In this case, the gap between the inner peripheral surface of the second mounting groove 55 and the motor part 70 may be sealed through a predetermined sealing means such as a mechanical seal.

Meanwhile, in an embodiment of the present invention, the second housing 40 includes a coolant moving path 61 allowing a coolant as a cooling medium to move therethrough and cooling heat generated in the motor part 70. The coolant moving path 61 includes coolant moving grooves 63, a coolant inlet 65, and a coolant outlet 67.

The coolant moving grooves 63 are formed in the second connection ribs 49 in the second housing 40, and are connected to the second mounting groove 55 of the second channel forming member 43. The coolant moving grooves 63 are connected to the gap between the inner peripheral surface of the second mounting groove 55 and the motor part 70.

The coolant inlet 65 is to introduce the coolant supplied through a coolant supplying means into the coolant moving grooves 63 and the gap between the inner peripheral surface of the second mounting groove 55 and the motor part 70. The coolant inlet 65 is formed in the second body 41 of the second housing 40, and penetrates through and is connected to the coolant moving groove 63 of any one of the second connection ribs 49.

As described above, the coolant is introduced into the coolant moving grooves 63 and the gap between the inner peripheral surface of the second mounting groove 55 and the motor part 70 through the coolant inlet 65 to cool the heat generated in the motor part 70. Therefore, the second connection ribs 49 of the second housing 40 serve as cooling fins radiating the heat.

In addition, the coolant outlet 67 is to discharge the coolant introduced into the coolant moving grooves 63 and the gap between the inner peripheral surface of the second mounting groove 55 and the motor part 70 and warmed while cooling the motor part 70. The coolant outlet 67 is formed in the second body 41, and penetrates through and is connected to the coolant moving groove 63 of the other of the second connection ribs 49.

In an embodiment of the present invention, the nozzle member or dilution air supplier 90 is installed at the shaft 71 of the motor part 70 between the pumping part 30 and the motor part 70. The nozzle member 90 sprays air sucked (introduced) through the air inlet 23 by the pumping part 30 while being rotated together with the shaft 71.

Figure 7:
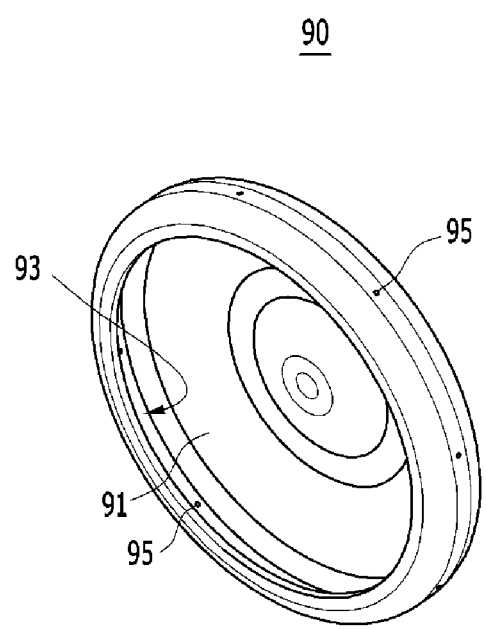
FIG. 7 is a view showing a nozzle member used in the device for decreasing a concentration of hydrogen exhausted from a fuel cell according to an embodiment of the present invention.

The nozzle member 90 is installed at the shaft 71 of the motor part 70 so as to be coaxial with the pumping part 30. The nozzle member 90 includes a nozzle body 91 having a disk shape having an outer ring part formed at an edge portion thereof, as shown in FIG. 7. The nozzle member 90 is a slinger nozzle including a spraying groove 93 formed at an inner side of the outer ring part in the nozzle body 91 and a plurality of nozzle holes 95 penetrating through the spraying groove 93.

Here, the nozzle holes 95, which are fine holes formed to penetrate through the spraying groove 93 toward the air diluting part 45, are formed to be spaced apart from each other by predetermined intervals in an outer ring direction along the spraying groove 93. Since the number and diameters of nozzle holes 95 may be changed depending on driving specifications of the fuel cell system, they are not limited to any specific value in an embodiment of the present invention.

Hereinafter, an action of the device 100 for decreasing a concentration of hydrogen exhausted from a fuel cell according to an embodiment of the present invention configured as described above will be described in detail with reference to the above drawings and the accompanying drawings.

Figure 8:
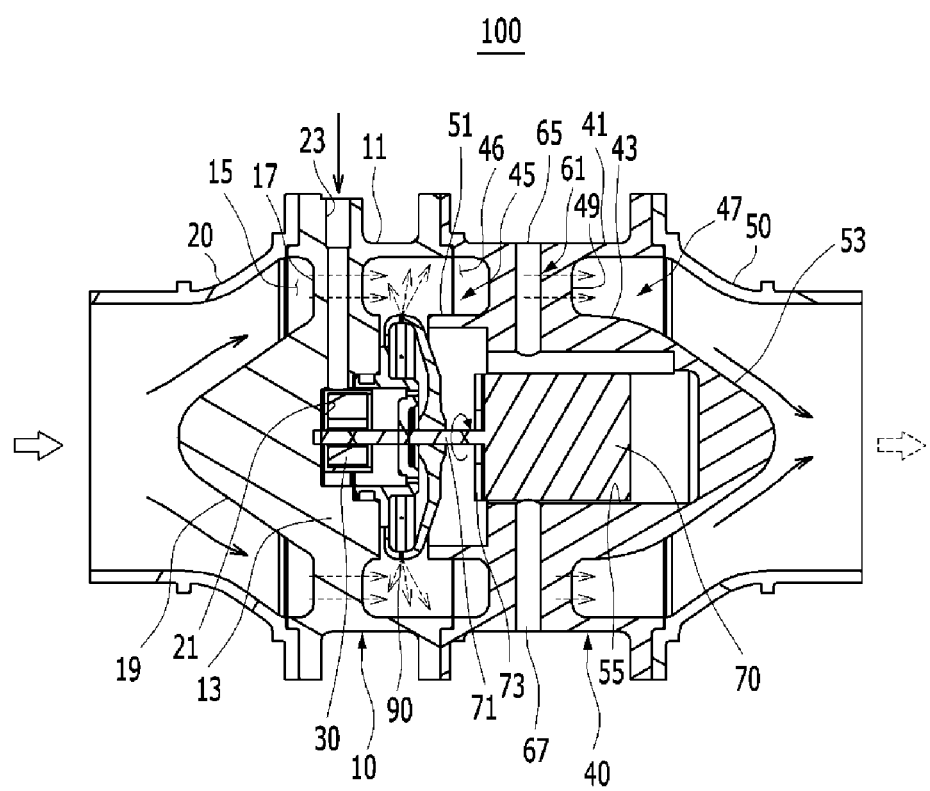
FIG. 8 is a view for describing an operation of the device for decreasing a concentration of hydrogen exhausted from a fuel cell according to an embodiment of the present invention.

FIG. 8 is a view for describing an operation of the device for decreasing a concentration of hydrogen exhausted from a fuel cell according to an embodiment of the present invention.

First, referring to FIG. 1, in an embodiment of the present invention, the fuel cell system 1 exhausts the hydrogen due to the cross-over together with the air from the cathodes 2a of the fuel cells 2c and exhausts the purge hydrogen from the anodes 2b of the fuel cells 2c, when the vehicle is started.

In addition, the fuel cell system 1 exhausts the purge hydrogen from the anodes 2b of the fuel cells 2c when the vehicle is driven, and exhausts the hydrogen due to the cross-over together with the air from the cathodes 2a of the fuel cells 2c when the vehicle is stopped or is in the idle condition (for example, the ISG condition).

The hydrogen exhausted from the fuel cells 2 in the vehicle condition as described above is supplied to the humidifier 5, and is exhausted together the air from the humidifier 5, and the exhaust gas containing the hydrogen and the air is exhausted through the exhaust line 9a of the exhaust system 9.

In a process of exhausting the exhaust gas through the exhaust line 9a as described above, in an embodiment of the present invention, an electrical operation signal is applied to the motor part 70 through a controller, as shown in FIG. 8. In this case, the motor part 70 rotates the pumping part 30 and the nozzle member 90 through the shaft 71.

In this process, the exhaust gas exhausted through the exhaust line 9a is introduced into the exhaust gas introduction pipe 20, and is introduced into the exhaust gas moving path 15 of the first housing 10 through the exhaust gas introduction pipe 20. In this case, the first gas inducing surface 19 of the first channel forming member 13 induces the exhaust gas into the exhaust gas moving path 15.

The exhaust gas moving along the exhaust gas moving path 15 of the first housing 10 is introduced into the air diluting part 45 of the second housing 40, and is introduced into the mixing zone 46 extended toward the coupled portion between the first body 11 and the second body 41 between the mixing protrusion 51 of the second channel forming member 43 and the inner peripheral surface of the second body 41 and connected to the exhaust gas moving path 15.

Meanwhile, in a process of introducing the exhaust gas into the mixing zone 46 of the air diluting part 45, in an embodiment of the present invention, the pumping part 30 is rotated by the motor part 70 as described above, and sucks the external air into an inner portion between the first and second housings 10 and 40 through the air inlet 23 of the first housing 10.

In this process, in an embodiment of the present invention, the nozzle member 90 is rotated by the motor part 70 as described above, and sprays the air sucked by the pumping part 30 to the mixing zone 46 of the air diluting part 45.

Here, the nozzle body 91 of the nozzle member 90 is rotated at a high speed by the motor part 70, and the air moves to the spraying groove 93 of the nozzle body 91 by centrifugal force and is sprayed at a high speed through the nozzle holes of the spraying groove 93.

As described above, the external air is sprayed to the mixing zone 46 through the nozzle member 90 simultaneously with introducing the exhaust gas into the mixing zone 46 of the air diluting part 45. Therefore, in an embodiment of the present invention, the exhaust gas and the air are mixed with each other in the mixing zone 46 to dilute the hydrogen in the exhaust gas by the external air, thereby making it possible to decrease a concentration of hydrogen.

In addition, in a state in which the hydrogen in the exhaust gas is diluted by the external air in the air diluting part 45, in an embodiment of the present invention, the diluted gas moves along the diluted gas moving path 47 of the second housing 40, and is exhausted into the atmosphere through the diluted gas exhaust pipe 50. In this case, the second gas inducing surface 53 of the second channel forming member 43 induces the diluted gas moving along the diluted gas moving path 47 to the diluted gas exhaust pipe 50 including an outlet.

On the other hand, in a process of diluting the hydrogen in the exhaust gas by the external air as described above, heat is generated in the motor part 70. Therefore, in an embodiment of the present invention, the coolant is injected into the coolant inlet 65 of the second housing 40 through the cooling supplying means.

Therefore, the coolant is introduced into the coolant moving grooves 63 in the second connection ribs 49 and the gap between the inner peripheral surface of the second mounting groove 55 and the motor part 70 through the coolant inlet 65, and cools the heat generated in the motor part 70. In this case, the heat generated in the motor part 70 is cooled by the coolant, and is discharged to the outside through the second connection ribs 49.

In addition, the coolant introduced into the coolant moving grooves 63 and the gap between the inner peripheral surface of the second mounting groove 55 and the motor part 70 and warmed while cooling the motor part 70 is discharged through the coolant outlet 67.

According to the device 100 for decreasing a concentration of hydrogen exhausted from a fuel cell according to an embodiment of the present invention configured as described above, the hydrogen in the exhaust gas exhausted from the humidifier 5 through the exhaust line 9a of the exhaust system 9 may be diluted by the external air introduced through a pumping structure and a nozzle spraying structure.

Therefore, in an embodiment of the present invention, the concentration of hydrogen exhausted into the atmosphere through the exhaust system 9 of the fuel cell system 1 is effectively decreased, thereby making it possible to satisfy fuel cell vehicle exhaust hydrogen restriction related regulations of Korea and global technical regulations (GTR) and secure a competitive advantage in terms of a decrease in hydrogen exhausted from the fuel cell vehicle.

Figure 9:
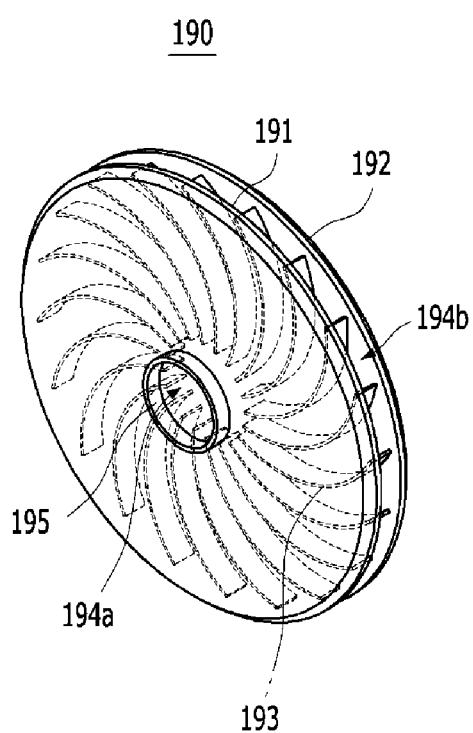
FIG. 9 is a view showing a modified example of the nozzle member used in the device for decreasing a concentration of hydrogen exhausted from a fuel cell according to an embodiment of the present invention.

FIG. 9 is a view showing a modified example of the nozzle member used in the device for decreasing a concentration of hydrogen exhausted from a fuel cell according to an embodiment of the present invention.

Referring to FIG. 9, a modified example of the nozzle member 190 according to an embodiment of the present invention may be formed in an impeller type, unlike the nozzle member including the fine nozzle holes as described above.

For example, the nozzle member or dilution air blower 190 has a structure in which a plurality of impeller wings 193 having a curved surface are disposed between first and second disks 191 and 192 and an air introduction hole 195 is formed in the first disk 191.

Here, the second disk 192 of the nozzle member 190 is coupled to the shaft of the motor part, and the air introduction hole 195 is connected between the impeller wings 193. An air introduction end 194a introducing air through the air introduction hole 195 and an air exhaust end 194b exhausting the air are formed between the impeller wings 193.

In this case, the impeller wings 193 have a shape in which they are bent toward edges of the first and second disks 191 and 192 on the basis of the air introduction hole 195. Further, the impeller wings 193 have a shape in which an air moving cross-sectional area therebetween gradually becomes large from the air introduction end 194a toward the air exhaust end 194b.

Therefore, the nozzle member 190 according to embodiments of the present modified example is rotated by the motor part, and introduces the external air sucked by the pumping part into the air introduction end 194a of the impeller wings 193 through the air introduction hole 195. The air introduced into the air introduction end 194a is exhausted through the air exhaust end 194b, and may be introduced into the air diluting part.

Therefore, in the present modified example, a relatively large flow rate of external air is sprayed to the air diluting part through the nozzle member 190 formed in the impeller type, thereby making it possible to further improve mixing performance between the exhaust gas and the external air.

Figure 10:
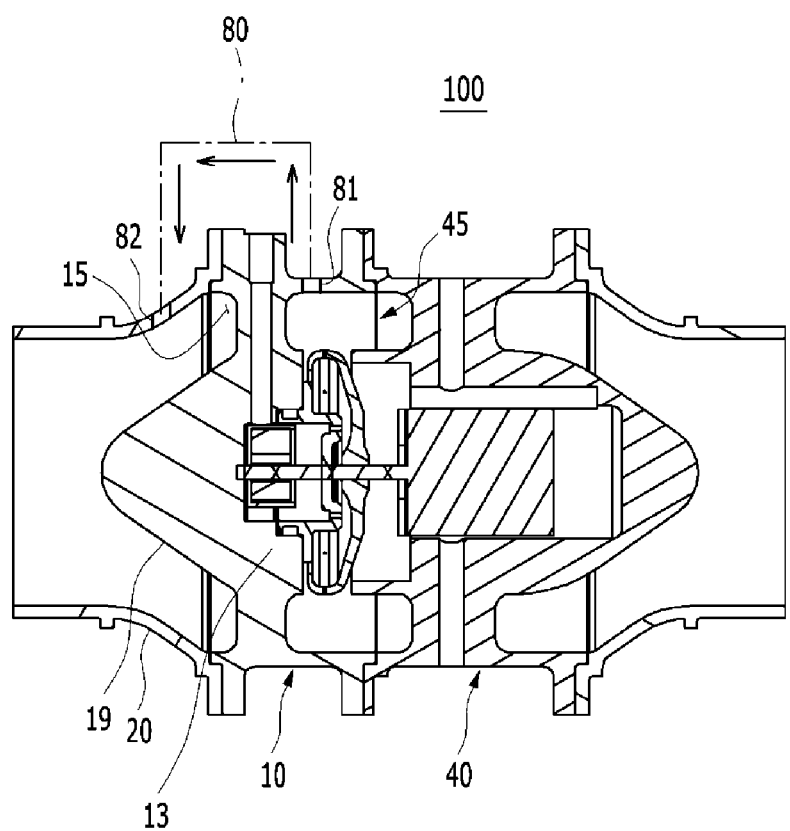
FIG. 10 is a view showing a modified example of the device for decreasing a concentration of hydrogen exhausted from a fuel cell according to an embodiment of the present invention.

FIG. 10 is a view showing a modified example of the device for decreasing a concentration of hydrogen exhausted from a fuel cell according to an embodiment of the present invention.

Referring to FIG. 10, a modified example of the device for decreasing a concentration of hydrogen exhausted from a fuel cell according to an embodiment of the present invention may include a bypass pipeline 80 connecting the front end of the exhaust gas moving path 15 of the first housing 10 and the air diluting part 45 to each other.

In detail, the bypass pipeline 80 connects the air diluting part 45 and the exhaust gas introduction pipe 20 between the first and second housings 10 and 40 to each other. To this end, a first connection hole 81 connected to the air diluting part 45 is substantially formed in the first housing 10. In addition, a second connection hole 82 connected to the first connection hole 81 through the bypass pipeline 80 is formed in the exhaust gas introduction pipe 20.

Therefore, in the present modified example, in a process of mixing the exhaust gas and the external air with each other in the air diluting part 45, a flow velocity of the exhaust gas at the front end of the exhaust gas moving path 15 is increased by the first gas inducing surface 19 of the first channel forming member 13, such that a pressure at the front end of the exhaust gas moving path 15 is decreased.

In this case, in the present modified example, some of the exhaust gas and the external air in the air diluting part 45 may be bypassed to the front end of the exhaust gas moving path 15 through the bypass pipeline 80 by a pressure difference between the air diluting part 45 having a relatively high pressure and the front end of the exhaust gas moving path 15 having a relatively low pressure.

Therefore, in the present modified example, the exhaust gas may be re-circulated from the air diluting part 45 to the front end of the exhaust gas moving path 15. Accordingly, a time in which the exhaust gas is introduced into the air diluting part 45 through the exhaust gas moving path 15 is delayed, thereby making it possible to further improve dilution performance of the hydrogen in the exhaust gas by the external air.

Figure 11:
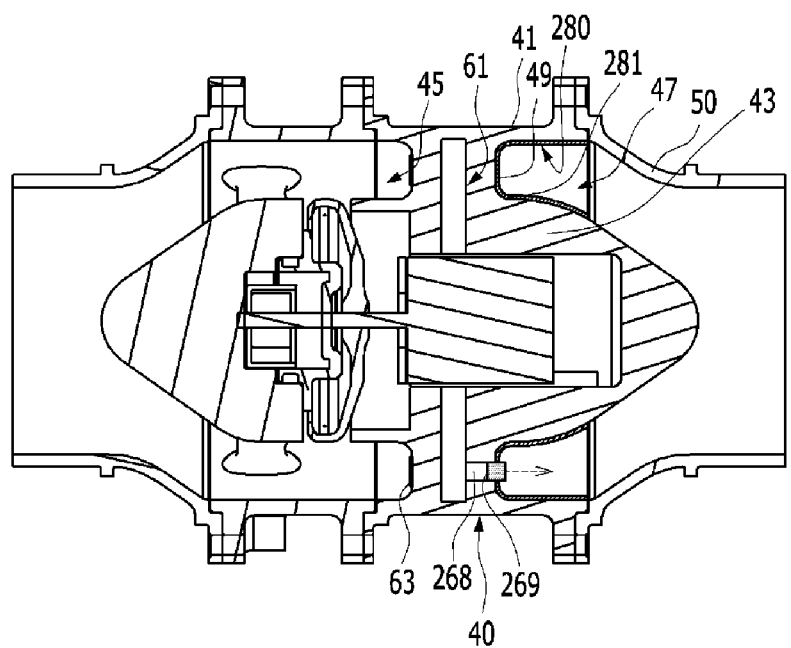
FIG. 11 is a view showing a device for decreasing a concentration of hydrogen exhausted from a fuel cell according to another embodiment of the present invention.

FIG. 11 is a view showing a device for decreasing a concentration of hydrogen exhausted from a fuel cell according to another embodiment of the present invention.

Referring to FIG. 11, the device 200 for decreasing a concentration of hydrogen exhausted from a fuel cell according to another embodiment of the present invention has a structure in which it may primarily decrease a concentration of hydrogen in exhaust gas by external air and secondarily decrease the concentration of hydrogen in the exhaust gas by a catalyst reaction.

In embodiments, in another embodiment of the present invention, the device 200 for decreasing a concentration of hydrogen exhausted from a fuel cell that may dilute a relatively high concentration of hydrogen included in the exhaust gas by the external air and the catalyst reaction in a low flow rate/low pressure condition in which a low flow rate of exhaust gas is exhausted through the exhaust line 9a when the vehicle is started and is stopped or is in the idle condition is provided.

To this end, the device 200 for decreasing a concentration of hydrogen exhausted from a fuel cell according to another embodiment of the present invention basically has the structure according to the embodiment described above, and includes a catalyst diluting part 280 disposed in the diluted gas moving path 47 of the second housing 40. Hereinafter, components that are the same as those of the embodiment described above will be denoted by the same reference numerals, and a description therefor will be omitted.

In another embodiment of the present invention, the catalyst diluting part 280 is to dilute hydrogen in the diluted gas in which a concentration of hydrogen is diluted by the external air in the air diluting part 45 by the catalyst reaction. The catalyst diluting part 280 is disposed in the diluted gas moving path 47 of the second housing 40.

The catalyst diluting part 280 includes a catalyst 281 deposited on an inner wall surface of the diluted gas moving path 47 in the second housing 40. The catalyst 281 may be a catalyst layer coated or deposited at a set thickness on the inner peripheral surface of the second body 41, the outer surface of the second channel forming member 43, and outer surfaces of the second connection ribs 49 in the diluted gas moving path 47.

The catalyst 281 reacts to hydrogen and oxygen in the diluted gas moving along the diluted gas moving path 47 to generate heat and water, thereby serving to decrease the concentration of hydrogen. The catalyst 281 separates the hydrogen in the diluted gas into protons and electrons, and allows the separated protons and electrons to react to oxygen in the air, thereby generating an exothermic reaction generating the heat and the water is performed.

Since the catalyst 281, in embodiments, can be a catalyst such as metal hydride according to the related art adsorbing the hydrogen to generate the exothermic reaction and generate the heat and the water, a detailed description therefor will be omitted in the present specification.

Therefore, in another embodiment of the present invention, the diluted gas moves along the diluted gas moving path 47 of the second housing 40 in a state in which the hydrogen in the exhaust gas is diluted by the external air in the air diluting part 45 to primarily decrease the concentration of hydrogen, as in the embodiment described above.

In this case, in a process of moving the diluted gas along the diluted gas moving path 47, the catalyst 281 of the catalyst diluting part 280 separates the hydrogen in the diluted gas into the protons and the electrons and generates the water and the heat by the exothermic reaction between the separated protons and electrons and the oxygen in the air.

In another embodiment of the present invention, since the hydrogen in the diluted gas reacts to the catalyst 281 while the diluted gas is uniformly dispersed along the diluted gas moving path 47, explosion sound and explosion pressure due to the catalyst reaction may be prevented.

Therefore, in another embodiment of the present invention, the hydrogen and the oxygen in the diluted gas are converted into water by the catalyst reaction of the catalyst 281, such that the hydrogen is diluted, thereby making it possible to secondarily decrease the concentration of hydrogen contained in the diluted gas. In a state in which the concentration of hydrogen in the diluted gas is secondarily decreased through the catalyst diluting part 280, the diluted gas is exhausted through the diluted gas exhaust pipe 50.

In another embodiment of the present invention described above, the concentration of hydrogen exhausted into the atmosphere may be effectively decreased by diluting the relatively high concentration of hydrogen included in the exhaust gas by the external air and the catalyst reaction in the low flow rate/low pressure condition in which the low flow rate of exhaust gas is exhausted through the exhaust line 9a when the vehicle is started and is stopped or is in the idle condition.

Meanwhile, in another embodiment of the present invention, the heat is generated in a process in which the hydrogen in the diluted gas reacts to the catalyst 281. This heat may be discharged to the outside by moving the coolant through the coolant moving path 61.

On the other hand, in another embodiment of the present invention, in various failure modes in which a high concentration of hydrogen is continuously exhausted, such as damage to the fuel cell stack, collision of the vehicle, a mode in which dilution by the air is not performed, and the like, heat may be rapidly generated by a reaction between the high concentration of hydrogen and the catalyst 281.

Therefore, the device 200 for decreasing a concentration of hydrogen exhausted from a fuel cell according to another embodiment of the present invention further includes a safety means forcibly exhausting the coolant moving along the coolant moving path 61 to the diluted gas moving path 47 to prevent an excessive rise in a temperature and a risk of a fire due to the reaction between the high concentration of hydrogen and the catalyst 281.

In another embodiment of the present invention, the safety means includes a coolant forcible exhaust hole 268 connecting the coolant moving path 61 and the diluted gas moving path 47 to each other and a cap 269 installed in the coolant forcible exhaust hole 268.

The coolant forcible exhaust hole 268 is formed in at least one of the second connection ribs 49 of the second housing 40, and is connected to the coolant moving groove 63 of the second connection rib 49. In embodiments, the coolant forcible exhaust hole 268 connects the coolant moving groove 63 of the second connection rib 49 and the diluted gas moving path 47 to each other.

In addition, the cap 269, which is fitted into the coolant forcible exhaust hole 268 and closes the coolant forcible exhaust hole 268, and is formed of a polymer material that may be destroyed at a set temperature (a high temperature).

Therefore, in the case in which the heat is rapidly generated due to the reaction between the high concentration of hydrogen and the catalyst 281 in the various failure modes in which the high concentration of hydrogen is continuously exhausted, the cap 269 formed of the polymer material opens the coolant forcible exhaust hole 268 while being destroyed by the heat in another embodiment of the present invention.

Therefore, the coolant moving along the coolant moving path 61 discharges the heat depending on the reaction between the high concentration of hydrogen and the catalyst 281 to the outside while being exhausted to the diluted gas moving path 47 through the coolant forcible exhaust hole 268.

Therefore, in another embodiment of the present invention, the excessive rise in the temperature and the risk of the fire due to the reaction between the high concentration of hydrogen and the catalyst 281 in the various failure modes in which the high concentration of hydrogen is continuously exhausted may be prevented.

Figure 12:
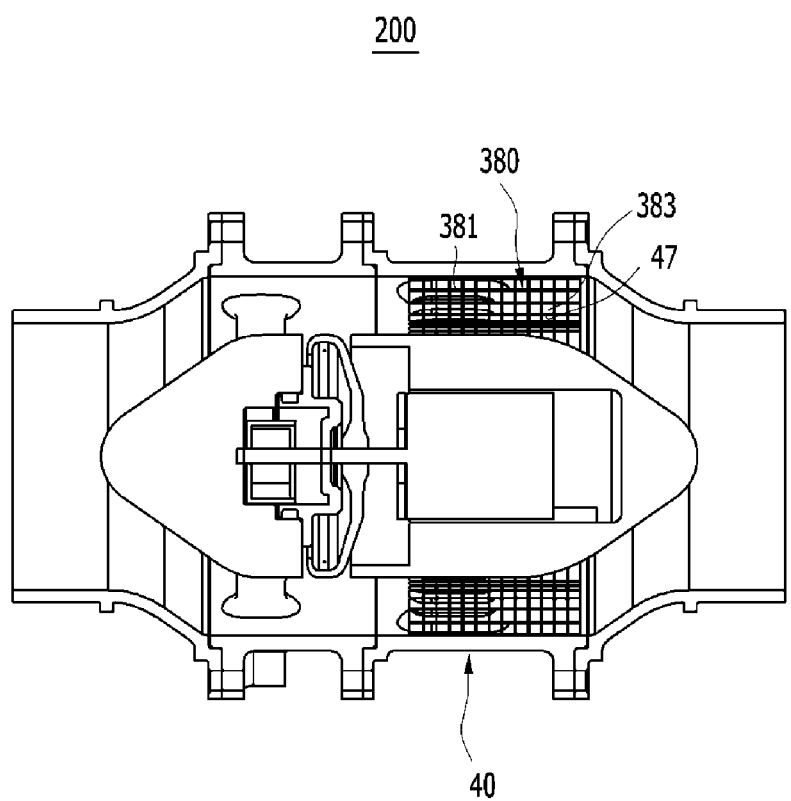
FIG. 12 is a view showing a modified example of the device for decreasing a concentration of hydrogen exhausted from a fuel cell according to another embodiment of the present invention.

FIG. 12 is a view showing a modified example of the device for decreasing a concentration of hydrogen exhausted from a fuel cell according to another embodiment of the present invention.

Referring to FIG. 12, in the modified example of the device 200 for decreasing a concentration of hydrogen exhausted from a fuel cell according to another embodiment of the present invention, a catalyst diluting part 380 may include a catalyst 381 having a plurality of lattice holes 383 formed to move the diluted gas and buried in the diluted gas moving path 47 in the second housing 40.

In the present modified example, the catalyst 381 is formed by supporting a catalyst material on a carrier, and the lattice holes 383 moving the diluted gas are formed in the carrier. The lattice holes 383 are arranged along the diluted gas moving path 47, and may be formed in a quadrangular lattice shape, a hexagonal lattice shape, or a triangular lattice shape. In addition, the catalyst material may include platinum and palladium.

The shapes of the lattice holes 383 of the catalyst 381 as described above are variously changed, thereby making it possible to decrease an amount of used catalyst material and maximize catalyst dilution reaction efficiency of the hydrogen in the present modified example.

Since the catalyst 381 is a catalyst such as metal hydride according to the related art adsorbing the hydrogen to generate the exothermic reaction and generate the heat and the water, a detailed description therefor will be omitted in the present specification.

Figure 13A:
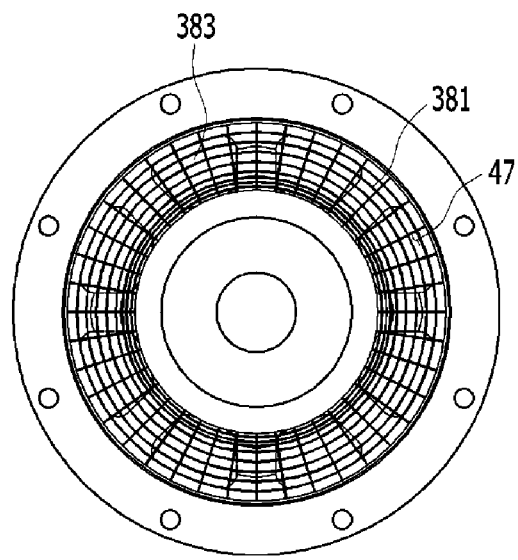
FIGS. 13A and 13B are views showing a catalyst structure used in a modified example of the device for decreasing a concentration of hydrogen exhausted from a fuel cell according to another embodiment of the present invention.
Figure 13B:
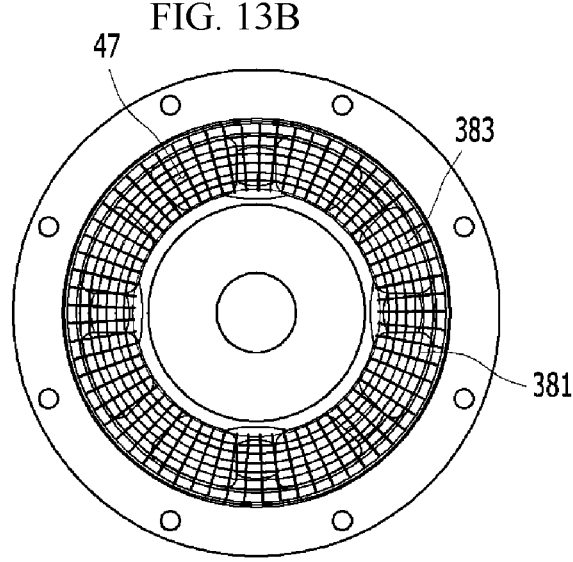

Here, the catalyst 381 may be formed so that cross-sectional areas of the lattice holes 383 gradually become small in a moving direction of the diluted gas, as shown in FIGS. 13A and 13B. In embodiments, the lattice holes 383 are formed so that moving cross-sectional areas of the diluted gas gradually become small from the front of the diluted gas moving path 47 into which the diluted gas is introduced toward the rear of the diluted gas moving path 47.

Therefore, in the present modified example, a reaction area between the hydrogen in the diluted gas and the catalyst material is increased by the lattice holes 383 as described above, thereby making it possible to further improve reaction efficiency and hydrogen concentration decreasing performance of the catalyst 381 and minimize differential pressure loss depending on movement of the gas.

Since the other components and acting effects of the device 200 for decreasing a concentration of hydrogen exhausted from a fuel cell according to another embodiment of the present invention as described above are the same as those of the embodiment described above, a detailed description therefor will be omitted.

Figure 14:
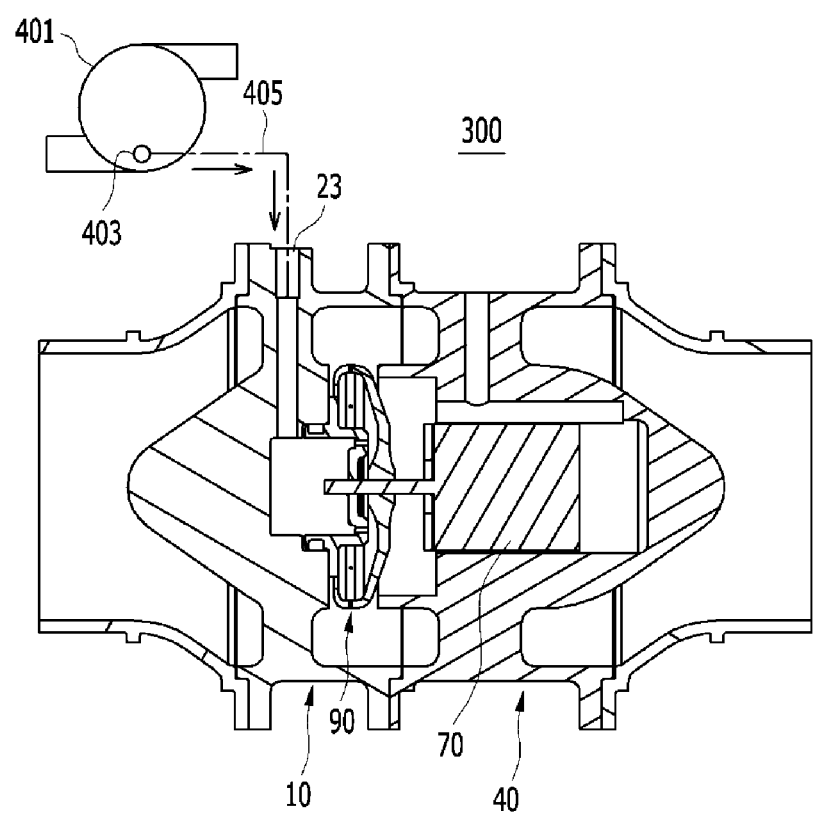
FIG. 14 is a view showing a device for decreasing a concentration of hydrogen exhausted from a fuel cell according to yet another embodiment of the present invention.

FIG. 14 is a view showing a device for decreasing a concentration of hydrogen exhausted from a fuel cell according to yet another embodiment of the present invention.

Referring to FIG. 14, the device 300 for diluting hydrogen in exhaust gas or decreasing a concentration of hydrogen exhausted from a fuel cell according to yet another embodiment of the present invention has a structure in which it does not require a vacuum pumping means for sucking the external air, unlike the embodiments described above.

Since a first housing 10, a second housing 40, a motor part 70, and a nozzle member 90 of the device 300 for decreasing a concentration of hydrogen exhausted from a fuel cell are the same as those of the embodiments described above, a description therefor will be omitted.

The device 300 for decreasing a concentration of hydrogen exhausted from a fuel cell according to the yet another embodiment of the present invention includes a connection line 405 connecting an air compressor 401 and the air inlet 23 of the first housing 10 to each other as the air supplying unit 3 (see FIG. 1) described above in order to remove the vacuum pumping means as in the embodiments described above.

Here, the air compressor 401 sucks and compresses the external air and discharges the compressed external air to the humidifier 5 (see FIG. 1), and a breathing hole 403 exhausting the air at the time of sucking/compressing and discharging the air is formed at a rear end of the air compressor 401. Since the configuration of the air compressor 401 described above is well known to a person of an ordinary skill in the art, a detailed description therefor will be omitted in the present specification.

The connection line 405 connects the breathing hole 403 of the air compressor 401 and the air inlet 23 to each other and supplies the air exhausted through the breathing hole 403 to the air inlet 23, in yet another embodiment of the present invention.

Therefore, in yet another embodiment of the present invention, the air exhausted through the breathing hole 403 of the air compressor 401 is introduced into the air inlet 23 through the connection line 405, thereby making it possible to dilute the hydrogen in the exhaust gas by the external air by a simple configuration without including the vacuum pumping means such the rotary vane for pumping the external air.

Since the other components and acting effects of the device 300 for decreasing a concentration of hydrogen exhausted from a fuel cell according to yet another embodiment of the present invention as described above are the same as those of the embodiments described above, a detailed description therefor will be omitted.

In embodiments, referring to FIGS. 1-14, an apparatus 100 for reducing a concentration of hydrogen in exhaust gas from a fuel cell 2 in a vehicle. The apparatus 100 is connected to an exhaust gas pipe 9. In one embodiment, the apparatus 100 is mounted between two consecutive exhaust pipe. The apparatus 100 includes an exhaust inlet for receiving exhaust gas and an exhaust outlet for discharging the exhaust gas and a housing including a housing wall defining an inner space between the exhaust inlet and the exhaust outlet. The inner space includes a central region and a peripheral region surrounding the central region. The apparatus 100 further includes an exhaust flow guide 13 located in the central region of the inner space and including a guide surface 19 spaced from the housing wall such that the exhaust gas received through the inlet is guided by the guide surface 19 to flow through the peripheral region of the inner space. The apparatus 100 includes a dilution air supplier 90, 190 located in the central region of the inner space and downstream the exhaust flow guide 13. The dilution air supplier receives dilution air from outside the housing and forcibly supply the dilution air toward the peripheral region in which the exhaust gas flows such that the dilution air is mixed with the exhaust gas flowing the peripheral region of the inner space, thereby reducing the concentration of hydrogen in the exhaust gas.

In embodiments, the apparatus 100 further includes an additional exhaust flow guide 43 to guide the exhaust gas flowing the peripheral region toward the outlet. The dilution air supplier 90, 190 is located between the exhaust flow guide 13 and the additional exhaust flow guide 43. The dilution air supplier 90, 190 includes two circular walls spaced from each other for providing a channel therebetween. Air can flow in a radial direction from the central portion to the periphery of the dilution air supplier. One of the circular walls has a hole at its central area for receiving dilution air supplied from outside the housing. In one embodiment, the dilution air flows generally in a radial direction and injected through holes 95 formed on and angularly arranged throughout a circumferential wall of the supplier 90 as shown in FIG. 7. The supplier rotates about a central axis for effective mixing of dilution air and the exhaust. In another embodiment, as shown in FIG. 9, fans are formed between and fixed to the two circular walls, and the periphery of the supplier is completely open such that dilution air is blown toward the peripheral region of the inner space when the supplier 190 rotates about a central axis.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 1 fuel cell system | 2 fuel cell stack |
| 2a cathode | 2b anode |
| 2c fuel cell | 3 air supplying unit |
| 4 hydrogen supplying unit | 5 humidifier |
| 6 hydrogen re-circulating unit | 7 heat/water managing unit |
| 8 purge valve | 9 exhaust system |
| 9a exhaust line | 9b one portion |
| 9c the other portion | 9d front connection end |
| 9e rear connection end | 10 first housing |
| 11 first body | 13 first channel forming member |
| 15 exhaust gas moving path | 17 first connection rib |
| 19 first gas inducing surface | 20 exhaust gas introduction pipe |
| 21 first mounting groove | 23 air inlet |
| 30 pumping part | 40 second housing |
| 41 second body | 43 second channel forming member |
| 45 air diluting part | 46 mixing zone |
| 47 diluted gas moving path | 49 second connection rib |
| 50 diluted gas exhaust pipe | 51 mixing protrusion |
| 53 second gas inducing surface | 55 second mounting groove |
| 61 coolant moving path | 63 coolant moving groove |
| 65 coolant inlet | 67 coolant outlet |
| 70 motor part | 71 shaft |
| 73 mounting bracket | 80 bypass pipeline |
| 81 first connection hole | 82 second connection hole |
| 90, 190 nozzle member | 91 nozzle body |
| 93 spraying groove | 95 nozzle hole |
| 191, 192 disk | 193 impeller wing |
| 194a air introduction end | 194b air exhaust end |

<Description of symbols>

| | |
|---|---|
| 195 air introduction hole | 280, 380 catalyst diluting part |
| 281, 381 catalyst | 268 coolant forcible exhaust hole |
| 269 cap | 383 lattice hole |
| 401 air compressor | 403 breathing hole |
| 405 connection line | |

What is claimed is:

1. A device for decreasing a concentration of hydrogen exhausted from a fuel cell, configured in an exhaust system of a fuel cell system exhausting exhaust gas containing hydrogen and air exhausted from the fuel cell into the atmosphere through an exhaust line, the device comprising:
a first housing connected to the exhaust line and having an exhaust gas moving path and an air inlet formed therein;
a pumping part installed in the first housing and sucking air through the air inlet;
a second housing coupled to the first housing and having an air diluting part and a diluted gas moving path formed therein, the air diluting part being connected to the exhaust gas moving path and the diluted gas moving path being connected to the air diluting part;
a motor part installed in the second housing so as to be connected to the pumping part;
a nozzle member installed at a shaft of the motor part between the motor part and the pumping part, and spraying the air introduced into the air inlet to the air diluting part while being rotated by the shaft; and
a catalyst diluting part disposed in the diluted gas moving path of the second housing and diluting hydrogen in diluted gas in which a concentration of hydrogen is diluted by air in the air diluting part by a catalyst reaction.

2. The device for decreasing a concentration of hydrogen exhausted from a fuel cell of claim 1, wherein:
a catalyst is deposited on an inner wall surface of the diluted gas moving path in the second housing.

3. The device for decreasing a concentration of hydrogen exhausted from a fuel cell of claim 1, wherein:
a catalyst has a plurality of lattice holes formed to move the diluted gas, and is buried in the diluted gas moving path in the second housing.

4. The device for decreasing a concentration of hydrogen exhausted from a fuel cell of claim 3, wherein:
the lattice holes are formed so that cross-sectional areas thereof gradually become small in a moving direction of the diluted gas.

5. The device for decreasing a concentration of hydrogen exhausted from a fuel cell of claim 1, wherein:
in the second housing,
a coolant moving path moving a coolant in order to cool the motor part is formed,
a coolant forcible exhaust hole connecting the coolant moving path and the diluted gas moving path to each other is formed, and
a cap formed of a polymer material destroyed at a set temperature is installed in the coolant forcible exhaust hole.

* * * * *